US012475683B2

(12) United States Patent
Lou et al.

(10) Patent No.: US 12,475,683 B2
(45) Date of Patent: Nov. 18, 2025

(54) DEEP LEARNING-BASED METHOD FOR GENERATING 7T MAGNETIC RESONANCE IMAGES FROM 3T MAGNETIC RESONANCE IMAGES

(71) Applicant: THE FIRST MEDICAL CENTER OF PLA GENERAL HOSPITAL, Beijing (CN)

(72) Inventors: Xin Lou, Beijing (CN); Caohui Duan, Beijing (CN); Xiangbing Bian, Beijing (CN); Jinhao Lyu, Beijing (CN)

(73) Assignee: THE FIRST MEDICAL CENTER OF PLA GENERAL HOSPITAL, Beijing (CN)

( * ) Notice: Subject to any disclaimer, the term of this patent is extended or adjusted under 35 U.S.C. 154(b) by 0 days.

(21) Appl. No.: 19/228,673

(22) Filed: Jun. 4, 2025

(65) Prior Publication Data

US 2025/0299471 A1   Sep. 25, 2025

Related U.S. Application Data

(63) Continuation of application No. PCT/CN2023/106952, filed on Jul. 12, 2023.

(30) Foreign Application Priority Data

Jul. 20, 2022 (CN) ............................ 202210863235

(51) Int. Cl.
*G06V 10/764* (2022.01)
*G06T 3/4053* (2024.01)
(Continued)

(52) U.S. Cl.
CPC .......... *G06V 10/764* (2022.01); *G06T 3/4053* (2013.01); *G06T 11/008* (2013.01);
(Continued)

(58) Field of Classification Search
CPC .... G06V 10/764; G06V 10/774; G06V 10/82; G06T 3/4053; G06T 11/008;
(Continued)

(56) References Cited

U.S. PATENT DOCUMENTS

2018/0238978 A1\*  8/2018  McNulty .............. G01R 33/365
2020/0065626 A1\*  2/2020  Kaufhold ................. G06N 3/08
(Continued)

FOREIGN PATENT DOCUMENTS

| CN | 108090871 A | 5/2018 |
|---|---|---|
| CN | 113554728 A | 10/2021 |
| CN | 114140341 A | 3/2022 |

OTHER PUBLICATIONS

Qu, L., Wang, S., Yap, PT., Shen, D. (2019). Wavelet-based Semi-supervised Adversarial Learning for Synthesizing Realistic 7T from 3T MRI. In: Shen, D., et al. Medical Image Computing and Computer Assisted Intervention—MICCAI 2019. MICCAI 2019. Lecture Notes in Computer Science(), vol. 11767. (Year: 2019).\*

(Continued)

*Primary Examiner* — Van D Huynh
(74) *Attorney, Agent, or Firm* — Nitin Kaushik

(57) ABSTRACT

The present invention discloses a deep learning-based method for generating 7T magnetic resonance (MR) images from 3T MR images. The method comprises the following steps: (1) Constructing a training dataset of paired 3T and 7T images; (2) Constructing a deep learning model for generating 7T images from 3T images; (3) Defining a loss function for the deep learning model for generating 7T images from 3T images; (4) Training the deep learning model to obtain optimal model parameters; and (5) Synthesizing 7T images from 3T images using the trained deep learning model. The invention employs a spatial alignment network to estimate and compensate for spatial mismatches between 3T and 7T images, thereby achieving superior 7T image synthesis.

1 Claim, 1 Drawing Sheet

(51) Int. Cl.
  *G06T 11/00* (2006.01)
  *G06V 10/774* (2022.01)
  *G06V 10/82* (2022.01)

(52) U.S. Cl.
  CPC ............ *G06V 10/774* (2022.01); *G06V 10/82* (2022.01); *G06T 2207/10088* (2013.01); *G06T 2207/20081* (2013.01); *G06T 2207/20084* (2013.01)

(58) Field of Classification Search
  CPC . G06T 2207/10088; G06T 2207/20081; G06T 2207/20084
  See application file for complete search history.

(56) References Cited

U.S. PATENT DOCUMENTS

| | | | | |
|---|---|---|---|---|
| 2020/0134446 | A1* | 4/2020 | Soni | G06N 3/0464 |
| 2021/0123999 | A1* | 4/2021 | An | G01R 33/56308 |
| 2021/0208227 | A1* | 7/2021 | Hardy | G06N 3/045 |
| 2022/0179026 | A1* | 6/2022 | Zaiss | G06T 7/11 |
| 2023/0081346 | A1* | 3/2023 | Shrivastava | G06N 3/0895 706/17 |
| 2023/0377324 | A1* | 11/2023 | Kim | G06V 10/82 |

OTHER PUBLICATIONS

Huy Quang Do, Pascal Bourdon, David Helbert, Mathieu Naudin, Rémy Guillevin. 7T MRI superresolution with Generative Adversarial Network. IS&T Electronic Imaging 2021 Symposium, 2021, San Francisco, United States. ff10.2352/ISSN.2470-1173.2021.18.3DIA-106ff. (Year: 2021).*

Wei, J., Pan, Y., Xia, Y., Shen, D. (2021). Learning to Synthesize 7 T MRI from 3 T MRI with Few Data by Deformable Augmentation. In: Lian, C., Cao, X., Rekik, I., Xu, X., Yan, P. (eds) Machine Learning in Medical Imaging. MLMI 2021. Lecture Notes in Computer Science(), vol. 12966. (Year: 2021).*

Bahrami, K., Shi, F., Rekik, I., Shen, D. (2016). Convolutional Neural Network for Reconstruction of 7T-like Images from 3T MRI Using Appearance and Anatomical Features. In: Carneiro, G., et al. Deep Learning and Data Labeling for Medical Applications. Dlmia Labels 2016 2016. (Year: 2016).*

* cited by examiner

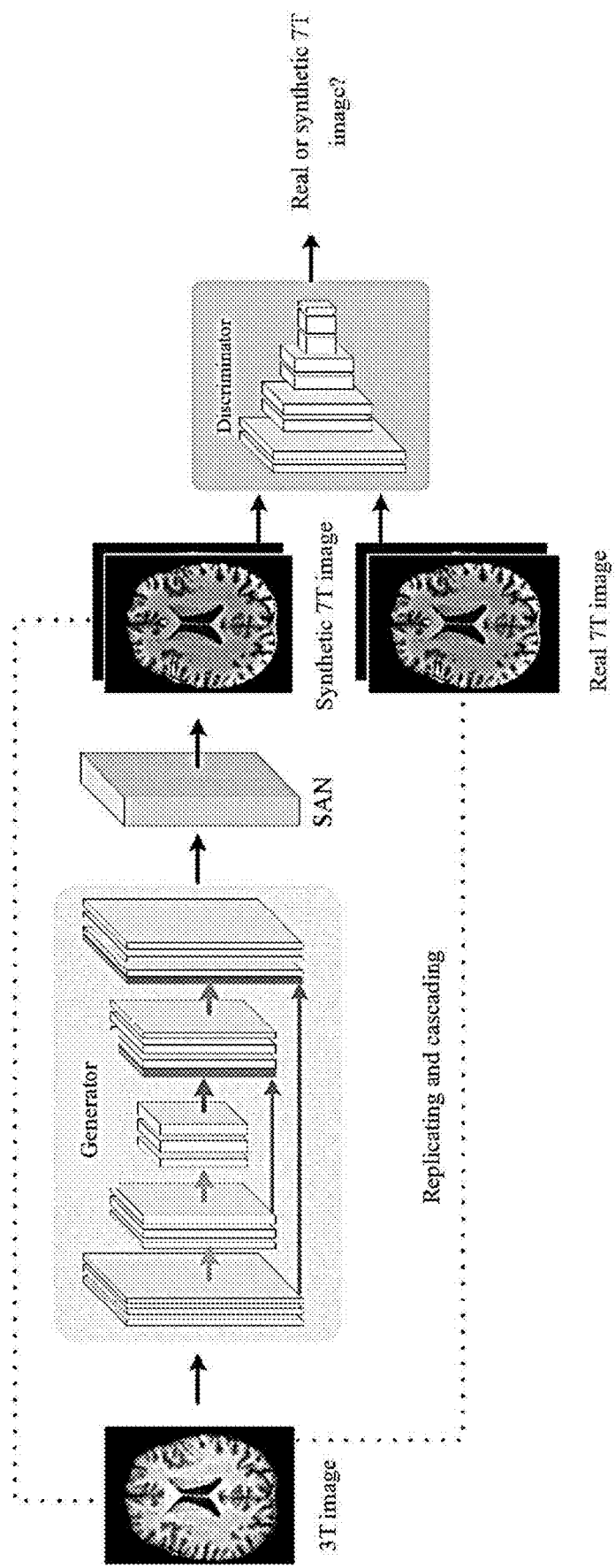

DEEP LEARNING-BASED METHOD FOR GENERATING 7T MAGNETIC RESONANCE IMAGES FROM 3T MAGNETIC RESONANCE IMAGES

CROSS-REFERENCE TO RELATED APPLICATIONS

The application claims priority to Chinese patent application No. 202210863235.8, filed on Jul. 20, 2022, the entire contents of which are incorporated herein by reference.

TECHNICAL FIELD

The present invention relates to the technical fields of magnetic resonance imaging (MRI), artificial intelligence, and image generation, specifically to a deep learning-based method for generating 7T MR images from 3T MR images. This method is applicable for synthesizing 7T MR images from 3T MR images to enhance image quality.

BACKGROUND

Compared to conventional 3T and 1.5T MRI systems, ultra-high-field 7T MRI provides images with higher resolution and signal-to-noise ratio (SNR). However, due to the high cost of 7T MRI scanners, their clinical adoption remains limited. To date, there are fewer than 100 7T MRI scanners worldwide, whereas over 20,000 3T MRI scanners are in use (Qu L, et al. *Medical Image Analysis*, 2020, 62:101663). Consequently, generating 7T images from 3T images holds significant clinical and research value.

Recently, deep learning has been successfully applied to various image generation tasks. For example: Bahrami et al. proposed a convolutional neural network (CNN) to learn the nonlinear mapping between 3T and 7T images (Bahrami K, et al. Medical Physics, 2017, 44 (5): 1661-1677). Qu et al. developed a deep learning method that fuses complementary information from spatial and wavelet domains to reconstruct 3T images into 7T images with superior anatomical detail and tissue contrast (Qu L, et al. Medical Image Analysis, 2020, 62:101663). However, learning the nonlinear mapping from 3T to 7T images typically requires large-scale, paired, and spatially aligned 3T and 7T datasets. Since paired 3T and 7T images are acquired in separate scans, prior studies often rely on linear registration tools to align them. Nevertheless, spatial mismatches between 3T and 7T images persist even after linear registration, potentially introducing artifacts or unrealistic displacements in the generated 7T images.

To address these limitations, the present invention proposes a deep learning-based framework for generating 7T MR images from 3T MR images. This method integrates a 7T image generation framework and a SAN. The SAN estimates and compensates for spatial mismatches between 3T and 7T images, thereby achieving superior 7T image synthesis.

SUMMARY

The present invention addresses the aforementioned technical challenges in generating 7T MR images from 3T MR images by proposing a deep learning-based method for 7T MR image generation from 3T MR images.

The above objectives of the present invention are achieved through the following technical solutions:

A deep learning-based method for generating 7T magnetic resonance (MR) images from 3T MR images, comprising the following steps:

Step 1: Constructing a training dataset which comprises multiple training sample pairs, each pair including a paired 3T image $x_i$ and 7T image $y_i$, where "i" denotes the index of the training sample pair.

Step 2: Constructing a deep learning model which comprises:
- A generator, configured to take a 3T image $x_i$ as input and output a synthetic 7T image $\hat{y}_i$;
- A spatial alignment network (SAN) module, configured to: take the synthetic 7T image $\hat{y}_i$ and the real 7T image $y_i$ as inputs; compute a displacement field $\emptyset$ between the synthetic 7T image $y_i$ and the real 7T image $y_i$; apply a spatial transformation to the synthetic 7T image $\hat{y}_i$ based on the displacement field $\emptyset$ to obtain a spatially aligned synthetic 7T image $\tilde{y}_i$; and
- A discriminator, configured to distinguish between synthetic image pairs $(x_i, \tilde{y}_i)$ and real image pairs $(x_i, y_i)$;

Step 3: Constructing loss functions for the generator and the discriminator of the deep learning model;

Step 4: Training the deep learning model using backpropagation and gradient descent, such that: the discriminator maximizes the probability of assigning correct labels to the input spatially aligned synthetic 7T image $\tilde{y}_i$ and the real 7T image $y_i$; and the difference between the synthetic 7T image and the real 7T image is minimized, resulting in a trained deep learning model.

The generator's loss function $L_G(\theta)$ is defined by the following formula:

$$L_G(\theta) = \frac{1}{N}\sum_{i=1}^{N}\|y_i - \tilde{y}_i\|_1 + \alpha\log(1 - D((x_i, \hat{y}_i), \theta_D)) + \beta\|\nabla\emptyset\|^2 \quad \text{Formula (1)}$$

Where, $\|\,\|_1$ denotes the L1 norm; N is the total number of training sample pairs; $D(\cdot, \theta_D)$ represents the discriminator, where $\cdot$ denotes the input and $\theta_D$ denotes the discriminator's network parameters; $\alpha$ and $\beta$ are weighting coefficients for the adversarial loss and smoothness loss, respectively; $\nabla\emptyset$ denotes the gradient of the displacement field.

The discriminator's loss function is defined by the following formula:

$$L_D(\theta) = \frac{1}{N}\sum_{i=1}^{N}\log(D((x_i, y_i), \theta_D)) + \log(1 - D((x_i, \hat{y}_i), \theta_D)) \quad \text{Formula (2)}$$

Compared to existing technologies, the present invention offers the following advantages: The SAN estimates and compensates for spatial mismatches between 3T and 7T images, thereby achieving superior 7T image synthesis, and the use of a generative adversarial network (GAN) enhances textural details and visual quality of the synthesized 7T images.

BRIEF DESCRIPTION OF DRAWINGS

The FIGURE illustrates the workflow diagram of the present invention.

DETAILED DESCRIPTION OF THE EMBODIMENTS

To facilitate understanding and implementation of the present invention by ordinary technical personnel in the field, the following provides a detailed description with reference to the FIGURE and specific examples. It should be understood that the described examples are for illustrative purposes only and do not limit the scope of the invention.

Example 1

A deep learning-based method for generating 7T MR images from 3T MR images comprises the following steps:

Step 1: Constructing a training dataset which comprises multiple training sample pairs, each pair including a paired 3T image and 7T image.

Step 1.1: Multiple paired 3T and 7T images of a subject were acquired using both a 3T MRI scanner (MAGNETOM Skyra, Siemens Healthineers) and a 7T MRI scanner (MAGNETOM Terra, Siemens Healthineers). 3T images were acquired using 3D MPRAGE sequence with the following parameters: Field of view (FOV): 224×210 mm$^2$; Matrix size: 224×210; Slice thickness: 1 mm; Repetition time (TR): 2,300 ms; Echo time (TE): 2.99 ms; Flip angle: 9°; Bandwidth: 240 kHz/px; Number of sagittal slices: 176; Spatial resolution: 1.0×1.0×1.0 mm$^3$; Scan time: 4 minutes 54 seconds. 7T images were acquired using 3D MPRAGE sequence with the following parameters: Field of view (FOV): 224×210 mm$^2$; Matrix size: 320×300; Slice thickness: 0.7 mm; Repetition time (TR): 2,300 ms; Echo time (TE): 1.95 ms; Flip angle: 8°; Bandwidth: 250 kHz/px; Number of sagittal slices: 208; Spatial resolution: 0.7×0.7×0.7 mm$^3$; Scan time: 5 minutes 14 seconds.

Step 1.2: The ith acquired 3T image is denoted as $x_i$, and its corresponding 7T image as $y_i$. $x_i$ and $y_i$ constitutes a training sample pair, where i is the training sample pair index. The total number of training sample pairs is N (i.e., the total number of 3T and 7T images is N). In this example, 6,800 paired 3T and 7T images were acquired, thus N=6,800.

Step 2: Constructing the deep learning model for 3T-to-7T image generation. The deep learning model comprises three core components: a generator, a discriminator, and a SAN module, as illustrated in the FIGURE. Each component is implemented as a convolutional neural network (CNN). The components are formally defined as: Generator: $G(\cdot, G_\theta)$, Discriminator: $D(\cdot, \theta_D)$, and SAN module: $R(\cdot, \theta_R)$. Where, $\theta_G$, $\theta_D$ and $\theta_R$ represent the network parameters of the generator, discriminator, and SAN module respectively, the symbol • denotes the input to each respective network, and the complete parameter set θ of the deep learning model is defined as: $\theta\{\theta_G, \theta_D, \theta_R\}$. The generator takes a 3T image $x_i$ as input and outputs a synthetic 7T image $\hat{y}_i$, i.e. $\hat{y}_i = G(x_i, \theta_G)$. The SAN module estimates and compensates for spatial mismatches between the synthetic 7T image $\hat{y}_i$ and the real 7T image $y_i$. The SAN module takes both the synthetic 7T image $\hat{y}_i$ and the real 7T image $y_i$ as inputs, calculates a displacement field Ø between them, and then applies a spatial transformation layer S to transform the synthetic 7T image according to the displacement field Ø, thereby obtaining a spatially aligned synthetic 7T image $\tilde{y}_i$, i.e. $\tilde{y}_i = S(\hat{y}_i, Ø)$. The discriminator is configured to discriminate between synthetic image pairs $(x_i, \tilde{y}_i)$ and real image pairs $(x_i, y_i)$.

The present example employs the following network architectures: U-Net architecture for both the generator and SAN module; and PatchGAN architecture for the discriminator. The U-Net architecture comprises convolutional layers, batch normalization layers, Max pooling layers and up-convolution layers. The PatchGAN architecture includes convolutional layers and batch normalization layers. The deep learning model is implemented using Python 3.8 programming environment and PyTorch deep learning framework.

Step 3: Defining loss functions for the 3T-to-7T image generation deep learning model.

Step 3.1: Defining the generator's loss function. The generator loss function $L_G(\theta)$ consists of three components: generation loss, adversarial loss, and smoothness loss:

$$L_G(\theta) = \frac{1}{N}\sum_{i=1}^{N} \|y_i - \tilde{y}_i\|_1 + \alpha \log(1 - D((x_i, \tilde{y}_i), \theta_D)) + \beta \|\nabla \phi\|^2 \quad \text{Formula (1)}$$

Where, $\|\ \|_1$ denotes the L1 norm; α and β represent weighting coefficients for the adversarial loss and smoothness loss respectively ∇Ø indicates the gradient of the displacement field Ø. In this example, α=0.05 and β=0.5.

Step 3.2: Defining the discriminator's loss function. The discriminator loss function $L_D(\theta)$ is defined as:

$$L_D(\theta) = \frac{1}{N}\sum_{i=1}^{N} \log(D((x_i, y_i), \theta_D)) + \log(1 - D((x_i, \tilde{y}_i), \theta_D)) \quad \text{Formula (2)}$$

Step 3.3: Defining the loss function for the deep learning model:

$$L(\theta) = L_G(\theta) + L_D(\theta) \quad \text{Formula (3)}$$

Step 4: Training the deep learning model to obtain optimal model parameters $\hat{\theta}$. The deep learning model is trained using backpropagation and gradient descent methods to minimize and maximize the loss function $L(\theta)$:

$$\min_{\theta_G, \theta_R} \max_{\theta_D} L_G(\theta) + L_D(\theta) \quad \text{Formula (4)}$$

During the training process, the discriminator is trained to maximize the probability of assigning correct labels to input spatially aligned synthetic 7T images $\tilde{y}$; and real 7T images $y_i$. Here, a higher value of $L_D(\theta)$ indicates greater probability of correct label assignment, i.e. $D((x_i, y_i), \theta_D)=1$, $D((x_i, \tilde{y}_i), \theta_D)=0$, where, Label 1 represents that the 7T image is the actual measured real 7T image corresponding to the 3T image; Label 0 represents that the 7T image is the synthetic 7T image corresponding to the 3T image. The generator is trained to minimize the difference between synthetic 7T images and real 7T images. A lower value of $L_G(\theta)$ indicates smaller differences, making it difficult for the discriminator to distinguish between synthetic and real images. This competitive training strategy enables simultaneous performance improvement of both networks.

In this example, the Adam algorithm is employed to alternately optimize the generator's loss function $L_G(\theta)$ and the discriminator's loss function $L_D(\theta)$. Training continues until model convergence is achieved (i.e., maximized $L_D(\theta)$ and minimized $L_G(\theta)$ are met), obtaining optimal model parameters $\hat{\theta}: \hat{\theta} = \{\hat{\theta}_G, \hat{\theta}_D, \hat{\theta}_R\}$. The Adam algorithm parameters are set as: Learning rate: 0.0001; First moment estimate (β1): 0.5; Second moment estimate (β2): 0.999.

Step 5: Synthesizing 7T images from 3T images using the generator of the trained deep learning model. After completing model training, only the 3T image x needs to be input. Through forward propagation of the model, the synthetic 7T image ŷ can be obtained: $\hat{y}=G(x,\theta_G)$.

The specific implementation methods described herein are merely illustrative examples of the present invention. The network architectures for the generator and SAN are not limited to U-Net, but may also include other convolutional neural networks such as residual networks. The model training methods described herein are not limited to Adam, but may also include other gradient optimization algorithms commonly used in deep learning, such as stochastic gradient descent and RMSProp. Technical personnel in the field of the present invention may make various modifications, supplements, or substitutions to the described implementation methods, provided such changes do not depart from the spirit of the invention or exceed the scope defined by the appended claims.

What is claimed is:

1. A deep learning-based method for generating 7T magnetic resonance (MR) images from 3T MR images, comprising the following steps:

Step 1: constructing a training dataset which comprises multiple training sample pairs, each pair including a paired 3T image $x_i$ and real 7T image $y_i$, where "i" denotes the index of the training sample pair;

Step 2: constructing a deep learning model which comprises:

a generator, configured to take a 3T image $x_i$ as input and output a synthetic 7T image $\hat{y}_i$;

a spatial alignment network (SAN) module, configured to: take the synthetic 7T image $\hat{y}_i$ and a real 7T image $y_i$ as inputs; compute a displacement field Ø between the synthetic 7T image $\hat{y}_i$ and the real 7T image $y_i$; apply a spatial transformation to the synthetic 7T image $\hat{y}_i$ based on the displacement field Ø to obtain a spatially aligned synthetic 7T image $\tilde{y}_i$; and a discriminator, configured to distinguish between synthetic image pairs $(x_i,\tilde{y}_i)$ and real image pairs $(x_i,y_i)$;

Step 3: constructing loss functions for the generator and the discriminator of the deep learning model;

Step 4: training the deep learning model using backpropagation and gradient descent, such that: the discriminator maximizes a probability of assigning correct labels to the spatially aligned synthetic 7T image $\tilde{y}_i$ and the real 7T image $y_i$ that are inputted; and the difference between the synthetic 7T image and the real 7T image is minimized, resulting in a trained deep learning model;

the generator's loss function $L_G(\theta)$ is defined by the following formula:

$$L_G(\theta) = \frac{1}{N}\sum_{i=1}^{N}|y_i - \tilde{y}_i|_1 + \alpha \log(1 - D((x_i, \tilde{y}_i), \theta_D)) + \beta\|\nabla\emptyset\|^2$$

where, $|\ |_1$ denotes the L1 norm; N is the total number of training sample pairs; $D(\bullet, \theta_D)$ represents the discriminator, where • denotes the input and $\theta_D$ denotes the discriminator's network parameters; $\alpha$ and $\beta$ are weighting coefficients for the adversarial loss and smoothness loss, respectively; $\nabla\emptyset$ denotes the gradient of the displacement field;

the discriminator's loss function is defined by the following formula:

$$L_D(\theta) = \frac{1}{N}\sum_{i=1}^{N}\log(D((x_i, y_i), \theta_D)) + \log(1 - D((x_i, \tilde{y}_i), \theta_D)).$$

* * * * *